(12) United States Patent
Alon et al.

(10) Patent No.: US 11,216,597 B2
(45) Date of Patent: Jan. 4, 2022

(54) SECURITY SYSTEM AND METHOD FOR PREVENTING ROLLBACK ATTACKS ON SILICON DEVICE FIRMWARE

(71) Applicant: NUVOTON TECHNOLOGY CORPORATION, Hsinchu Science Park (TW)

(72) Inventors: Moshe Alon, Tel-Aviv (IL); Avraham Fishman, Raanana (IL); Ben Bender, Beit Shemesh (IL); Boaz Tabachnik, Gimzo (IL); Eyal Cohen, Kfar Saba (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 21 days.

(21) Appl. No.: 16/874,241

(22) Filed: May 14, 2020

(65) Prior Publication Data

US 2021/0357537 A1 Nov. 18, 2021

(51) Int. Cl.
*G06F 21/79* (2013.01)
*G06F 21/57* (2013.01)
(Continued)

(52) U.S. Cl.
CPC .............. *G06F 21/79* (2013.01); *G06F 1/24* (2013.01); *G06F 21/554* (2013.01);
(Continued)

(58) Field of Classification Search
CPC ...... G06F 21/79; G06F 21/575; G06F 21/577; G06F 21/554; G06F 21/572
(Continued)

(56) References Cited

U.S. PATENT DOCUMENTS 8,543,839 B2 * 9/2013 Sibert ..................... G06F 8/65
713/193
8,694,766 B2 * 4/2014 Toelkes ................ G06F 9/4418
713/2
(Continued)

FOREIGN PATENT DOCUMENTS

WO 2014/131652 A1 9/2014

OTHER PUBLICATIONS

Marcus Brandenburger,"Rollback and Forking Detection for Trusted Execution Environments using Lightweight Collective Memory" IEEE/2017, pp. 157-168 (Year: 2017).*
(Continued)

*Primary Examiner* — Samson B Lemma
(74) *Attorney, Agent, or Firm* — Oliff PLC (57) ABSTRACT

A chip system comprising ROM code including a bootloader which runs whenever the chip is powered on; and programmable fuse array memory storing version identifiers, NVMs in which copies of a version of bootable firmware are stored, wherein a first identifier is stored including active major number and minor numbers, signed with a private key; wherein a second identifier is stored including recovery major and minor numbers, signed with said private key; and hardware which obeys a first command by the boot ROM code to disable until next system reset, writing to the recovery NVM other than to the bootloader, and obeys a second command, to lift write protection of the recovery NVM, wherein firmware images associated with both said versions, and both said identifiers, are signed with said private key, and the boot ROM code authenticates firmware image/s and said identifiers.

29 Claims, 5 Drawing Sheets

(51) Int. Cl.
  *G06F 1/24* (2006.01)
  *G06F 21/55* (2013.01)
(52) U.S. Cl.
  CPC .......... *G06F 21/572* (2013.01); *G06F 21/575* (2013.01); *G06F 21/577* (2013.01)
(58) Field of Classification Search
  USPC ........................................................ 713/193
  See application file for complete search history.

(56) References Cited

U.S. PATENT DOCUMENTS

| | | | | |
|---|---|---|---|---|
| 9,165,143 | B1* | 10/2015 | Sanders | G06F 21/76 |
| 9,230,112 | B1* | 1/2016 | Peterson | G06F 9/4406 |
| 10,997,297 | B1* | 5/2021 | Lin | G06F 8/65 |
| 2008/0168275 | A1* | 7/2008 | Atley | G06F 21/575 |
| | | | | 713/189 |
| 2008/0175381 | A1 | 7/2008 | Drehmel et al. | |
| 2014/0250290 | A1 | 9/2014 | Stahl et al. | |
| 2015/0058979 | A1* | 2/2015 | Peeters | G06F 21/575 |
| | | | | 726/22 |
| 2017/0308705 | A1 | 10/2017 | Karaginides et al. | |
| 2019/0163909 | A1* | 5/2019 | Schilder | H04L 9/0822 |

OTHER PUBLICATIONS

"Rollback Protection," https://developer.trustedfirmware.org/w/tf_m/design/secure_storage_service/rollback_protection/; retrieved on Feb. 18, 2019.

"How to identify Qfuse (Anti-rollback) version of LG KDZ firmware," https://www.mylgphones.com/how-to-identify-qfuse-anti-rollback-version-of-lg-kdz-firmware.html; retrieved on Nov. 26, 2018.

"Intel® Quark™ Microcontroller Software Interface—Bootloader Security Features," https://www.intel.com/content/dam/www/public/us/en/documents/guides/bootloader-security-features-programmers-guide.pdf; retrieved Apr. 2017.

"Implementing Nonvolatile, Nonresettable Counters for Embedded Systems," https://www.maximintegrated.com/en/design/technical-documents/app-notes/5/5042.html; retrieved Jun. 8, 2011.

* cited by examiner

401. first FW image is stored identically in both the active and recovery NVMs. The OTP number matches the major number stored in both NVMs (e.g. active version number=1.2, recovery version number=1.2, OTP number=1)

↓

402. new FW image is loaded into the Active NVM (with higher major number, (e.g. 2.0, 1.2, 1))

↓

403. After a reset, the boot loader authenticates and tests the active NVM content for validity and reliability (typically, if the firmware is not valid, the boot loader halts)

↓

404. When the bootloader sees that the active major is greater than the OTP number, the new firmware image is written over the older firmware image in the recovery NVM. (e.g. 2.0, 2.0, 1)

405. Another bit in the Fuse Array is programmed and the OTP number now matches the active major and recovery major (e.g. 2.0, 2.0, 2)

↓

406. The recovery NVM and the Fuse Array are locked until next system reset. The major update is complete

Fig. 5

501. The first firmware image is stored identically in both the active and recovery NVMs 502. The OTP number matches the major number stored in both NVMs (active version number=1.2, recovery version number=1.2, OTP number=1)

503. The new firmware image is loaded into the active NVM (with higher minor number, (1.3, 1.2, 1))

504. After a reset, the boot loader authenticates and tests the active NVM content for validity and reliability (if the firmware is not valid, the boot loader halts)

505. When the boot loader sees that the active minor is greater than the recovery minor, the new firmware image is written over the older firmware image in the recovery NVM. (1.3, 1.3, 1)

In this case the OTP number is NOT changed

506. The recovery NVM and the Fuse Array are locked until next system reset. The minor update is complete

SECURITY SYSTEM AND METHOD FOR PREVENTING ROLLBACK ATTACKS ON SILICON DEVICE FIRMWARE

FIELD OF THIS DISCLOSURE

The disclosure relates to semiconductor devices, and, more particularly, to preventing attacks on semiconductor devices.

BACKGROUND FOR THIS DISCLOSURE

IBM patent document US20080175381A1 describes fuses for storing security version data. Methods and devices that may be utilized in systems to dynamically update a security version parameter used to encrypt secure data are provided. The IBM system includes a device for encrypting blocks of data to be stored in memory external to the device, comprising first persistent storage elements for storing a security version parameter; second persistent storage elements for storing master key data; an encryption engine configured to encrypt secure blocks of data to be stored in the external memory, wherein at least one of: the encrypted secure blocks or an integrity check value generated therefor, are affected by the security version parameter; and a mechanism for modifying the first persistent storage elements to update the security version parameter without modifying previously modified first persistent storage elements.

Grouping firmware versions in a single OTP setting is described in:
https://developer.trustedfirmware.org/w/tf_m/design/secure_storage_service/rollback_protection/

The above publication describes an ARM platform security architecture, which provides guidelines to protect against roll-back and an example that makes the roll-back reliable. Inter alia, the publication states that "A suitable implementation might employ one counter per software instance, or group together a list of version numbers inside a database file, which is itself versioned using a single counter."

The following link: https://www.mylgphones.com/how-to-identify-qfuse-anti-rollback-version-of-lg-kdz-firmware html states: "Your phone's current software version is ZVA, and its Qfuse version is ARB01. You want to downgrade from ZVA to ZV6, But the ZV6 firmware has Qfuse version ARB00." The publication also advocates: "Don't flash a KDZ or TOT firmware with ANTI-rollback (Qfuse) Version less than your device's current Qfuse Version". Other state of the art systems are described in:
US20140250290A1/en
WO2014131652A1/en
US20170308705A1/en
https://www.intel.com/content/dam/www/public/us/en/documents/guides/bootloader-security-features-programmers-guide.pdf A method for implementing nonvolatile, non-resettable counters for embedded systems is described in a publication available online here:
https://www.maximintegrated.com/en/design/technical-documents/app-notes/5/5042.html.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments seek to provide a security system and method preventing rollback attacks on silicon device firmware.

Certain embodiments seek to provide a system and method for extending a silicon device's lifetime.

Certain embodiments seek to provide a secure rollback prevention method, and system, for one-time programmable memories.

Certain embodiments seek to provide a lifetime extension feature, e.g. in an OTP, which typically comprises a version number decoding protocol in the OTP which saves OTP version bits, relative to conventional version number decoding schemes.

Certain embodiments seek to provide an extra copy of firmware in a write protected NVM.

Certain embodiments seek to provide version control using two copies on external memory/memories.

According to certain embodiments, a secure rollback prevention system is provided which uses multiple copies of data, at least on each of at least two external non-volatile memory devices and on an OTP.

Typically, there is an internal OTP and external NVM (e.g. flash). One firmware copy in one NVM is open for read/write, hence is updatable, whereas the other copy of the firmware in a second NVM (not the OTP) is closed for any read/write. The term 'external" typically comprises non-volatile memory device/s which are external to the silicon device containing the OTP memory device. The two "external flashes" may be on the same board/circuit, but need not be integrated on the silicon.

Optionally, a single device may be used, a portion of which is write protected.

Certain embodiments seek to provide enhanced security for memories, e.g. OTPs, by ensuring rollback prevention including storing dual copies of a code's version number, in external non-volatile memory devices.

Certain embodiments seek to provide secure version control, despite limited OTP space.

Certain embodiments seek to provide secured hierarchical version control using OTP and two version copies stored on flash. In hierarchical version control, there is more than one version type, including major and minor version numbers that have different security levels. The major version may be stored in OTP and may be copied in flashes while the minor version is in flashes only. The OTP version cannot be decreased, while the flash version can. For example, 3.3 can change to 3.2, but not 2.4.

Certain embodiments use two signed copies of version fields in external memory devices possibly combined with OTP version fields. The two copied version numbers in the external devices, at least one of which is not accessible to/by the main processor, protect against software attacks on a single SPI device by holding a copy of the version number in a second SPI device accessible only by the ROM code of the ASIC at boot time.

The following terms may be construed either in accordance with any definition thereof appearing in the prior art literature, or in accordance with the specification, or to include in their respective scopes, the following:

FW (firmware) image—bootable FW signed with a cryptographic key (such as RSA or ECC).

The term "image" is intended to include a state of firmware code that is associated with a given version number. In an upgrade, a given "image" associated with version number n may be superseded by a later-installed "image" associated with, say, version number n+1. An upgrade may comprise an action that installs a firmware image that is later than the currently installed version.

Boot up—from the time of chip power up (or reset) until the boot ROM code allows execution of firmware.

Firmware Version (FWV)—an identifier, typically an incremental number counter, assigned uniquely to a specific version of firmware, for example 1.0 or 53.37, typically Including a "Major Number" and "Minor Number" which, in notation, may be separated by a period or point.

Active NVM—The main storage of the boot FW image, this memory being readable and writable after boot-up.

Recovery NVM—The memory dedicated to securing the FW from rollback attacks. This memory is not readable or writable after boot-up.

Major Number—versions of firmware (aka Major Updates) for which it is sought to provide rollback protection. Typically, each NVM stores such a number ("recovery major").

Minor Number—the minor number may be used to denote less security-sensitive updates to firmware for which it is sufficient to provide weaker rollback protection, e.g. not recorded by OTP number ("Minor Update"). Each NVM may store such a number ("recovery minor").

Fuse Bit Array—an array of OTP bits, each bit corresponding to a single major number.

OTP Number—The highest programmed fuse array bit corresponding to the highest major number.

Fuse array: an area inside OTP that is reserved for storing latest major-number.

Firmware upgrade versioning—includes assigning unique version names or unique version numbers to respective unique states of firmware being upgraded. When numbers are used, the version number typically includes a major and minor number. Major and minor numbers are typically each assigned in increasing order such that later versions have a larger major number and/or minor number, than earlier versions do.

Non-volatile memory (NVM): memory which, once programmed, retains its value, even upon loss of power.

OTP: one-time programmable memory. A type of non-volatile memory (NVM) that permits data to be written to memory only once. Since data can be written only once, an OTP device cannot be hacked by malicious software updates.

Flash memory: a type of non-volatile storage or memory aka NVM which is erasable. Typically, flash memory is used for storing programs for microprocessors. Since flash is erasable, a programmed application can be removed and replaced, or updated. This means that devices can be reprogrammed rather than replaced, which lowers development costs. Also, flash memory may support in-field software updates.

SPI Interface or Serial Peripheral Interface: A non-limiting example of an interface for interfacing to slow or serial peripherals, which is simple, hence low-cost, because it has a chip select line rather than an addressing scheme. SPI is a serial protocol that can talk to various devices, including serial flash devices. SPI interfaces may be faster than cheap embedded controller alternatives (e.g. 133 MHz). Some SPI interfaces support 2-bit and/or 4-bit data buses which yields transfer rates which are higher than those achieved by pure serial interfaces.

SPI Flash: cost-effective way of building off-chip non-volatile memory, comprising a flash module that is interfaced to cover SPI. SPI flash modules are advantageous because of their low cost and small footprint. For example, a chip which holds 32 MB, may cost only a few dollars.

External: can be physically replaced on the circuit board.

Chip select (CS) aka slave select (SS): a control line in digital electronic devices which selects a subset (1 or more) from among a set of integrated circuits aka chips which are all connected to a single computer bus. The Serial Peripheral Interface Bus aka SPI bus is an example of a bus that uses a chip/slave select line.

There is thus provided a computerized system protected from rollback attacks which might otherwise occur when the system's firmware is changed, thereby to define versions of the firmware, the system comprising all or any subset of the following:

i. a chip including
   a. ROM code typically including a bootloader (aka boot ROM code) which may be integrated into the chip silicon, and wherein the boot ROM code runs whenever the chip is powered on or reset; and/or
   b. programmable fuse array memory (e.g. One-Time-Programmable (OTP) memory) in which to store version identifiers (e.g. version numbers);
ii. First (aka active) and/or second (aka recovery) non-volatile memories (aka NVMs) in which first and/or second copies of a version of bootable firmware (aka firmware which is loaded on boot), may respectively be stored;
   wherein a first identifier is typically stored in the active NVM, which, when stored, uniquely identifies the version, the first copy of which may be stored in the active NVM, the first identifier typically including at least an active major number and/or an active minor number, both typically signed with a private key;
   wherein a second identifier is stored e.g. in the recovery NVM which, when stored, typically uniquely identifies the version, the second copy of which is typically stored in the recovery NVM, the second identifier typically including at least a recovery major number and/or a recovery minor number, both of which may be signed with the private key; and
iii. A hardware device which typically obeys a first command, provided e.g. by the boot ROM code after boot-up aka at bootloader completion, to lock (aka disable at least writing to aka provide write protection to), e.g. until next system reset, at least the recovery NVM (and optionally the OTP) including ensuring at least the recovery NVM (and optionally the OTP) is not writeable, aka not accessible, for writing, typically other than to the bootloader, and/or obeys a second command, provided by the boot ROM code typically upon the next system reset, to lift the write protection of at least the recovery NVM (and optionally the OTP), thereby to provide a system able, typically, to prevent an older version of the firmware from being booted up, e.g. once a newer version of the firmware has been validated.

Typically, firmware images associated with both the versions, and/or both the identifiers, are signed with the private key.

Typically, the boot ROM code is configured to authenticate at least one firmware image and/or to authenticate one or both of the first and second identifiers.

Embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings:

FIG. 1 shows a known algorithm which increments the counter in a 32-byte memory page.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application, if and as appropriate, and which may employ any suitable architectural option such as but not limited to ASIC or DSP or any suitable combination thereof. Any hardware component mentioned herein may in fact include either one or more hardware devices e.g. chips, which may be co-located or remote from one another.

DETAILED DESCRIPTION OF CERTAIN EMBODIMENTS

Figure 1:
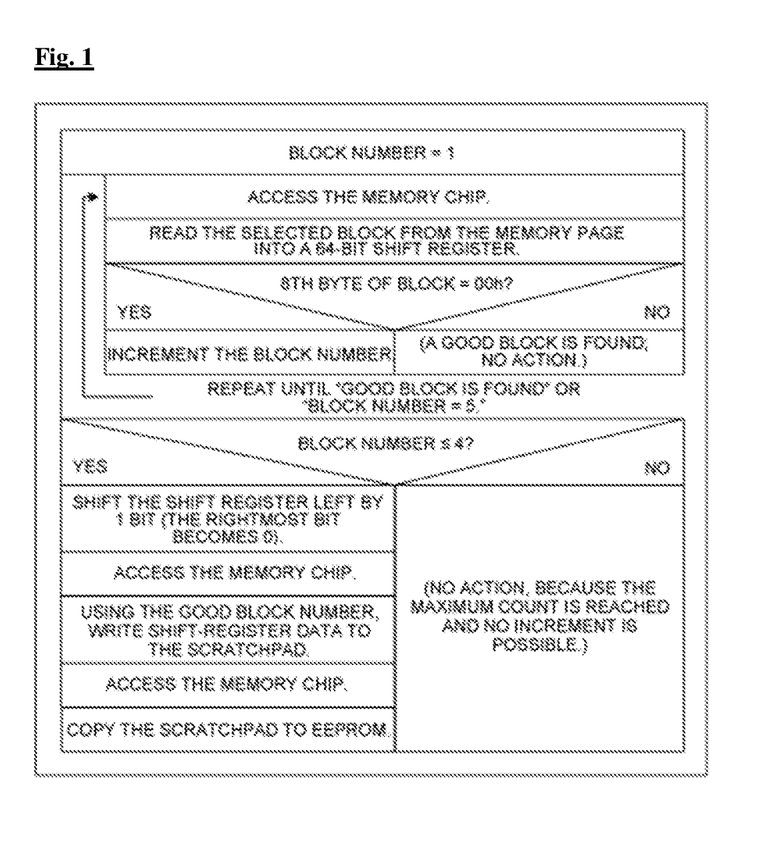
FIG. 1 is a simplified flowchart illustration of a known process in which a serial number of a memory chip can be used to detect tampering events in which a memory chip is replaced with one that has a lower count value. Specifically.

EEPROMs that include EPROM-emulation mode are useful for implementing nonvolatile, non-resettable counters. The serial number of the memory chip can be used to detect tampering events in which a memory chip is replaced with one that has a lower count value. FIG. 1 is an example of a known algorithm (see e.g. https://www.maximintegrated.com/en/design/technical-documents/app-notes/5/5042.html) which increments the counter in a 32-byte memory page.

A common attack method used to compromise code takes advantage of already known code vulnerabilities and weaknesses. To protect against these kinds of attacks, code suppliers regularly maintain their code, which typically involves replacing an old version of code, currently stored on silicon which is known, or has now been found, to be vulnerable to a certain attack, with a newer version of the code which is not vulnerable to such attacks.

However, if an adversary manages to replace (aka "rollback") the new maintained non-vulnerable code version with an old and vulnerable code version, the adversary can then take advantage of the old code's known vulnerabilities. To protect against this attack path, a code version number may be stored, e.g. inside a silicon device on an OTP memory, making it possible to ensure that the code version is the newest one, not an older hence vulnerable one. The OTP (One Time Programmable) memory cannot be erased, therefore the version in OTP cannot be rolled back. Yet since OTP space for code version numbers is limited, this has limited the amount or number of code updates or versions a given system can receive.

Certain embodiments resolve this by using two signed copies of version fields in external memory devices (SPI flash), possibly combined with OTP version fields. Thus one embodiment of the present invention uses just two signed external copies, and another uses the two external copies combined with OTP version fields. According to the former embodiment (which uses two flashes only), typically, both flashes initially contain version 1 (1,1). The active flash version number is then updated to 2, at the time of active flash update the recovery flash is write protected, (2,1). At next reset the active flash content is tested for validity and reliability. If the active flash version was found to be valid (3), the secured code (that now has access to the recovery flash) copies the active flash content to the recovery flash including the version number (2,2). The recovery flash is then write protected before allowing less secure code to be executed.

According to the latter embodiment (which uses two flashes and also an OTP), flashes 1, 2 each contain major and minor versions, whereas the OTP contains only the major version 1 (1.2, 1.2, 1). The active flash version number is updated to 2.0, at the time of active flash update the recovery flash is still write protected, (2.0, 1.2, 1). At next reset the active flash content is tested for validity and reliability. If the active flash version was found to be valid (the above step), the secured code (that now has access to the recovery flash and to the OTP), copies the active flash content to the recovery flash including the version number (2.0, 2.0, 1). In addition, the OTP version is updated with the major version (2.0, 2.0, 2). The recovery flash is then write protected and the OTP is locked, before allowing less secure code to be executed.

Figure 2:
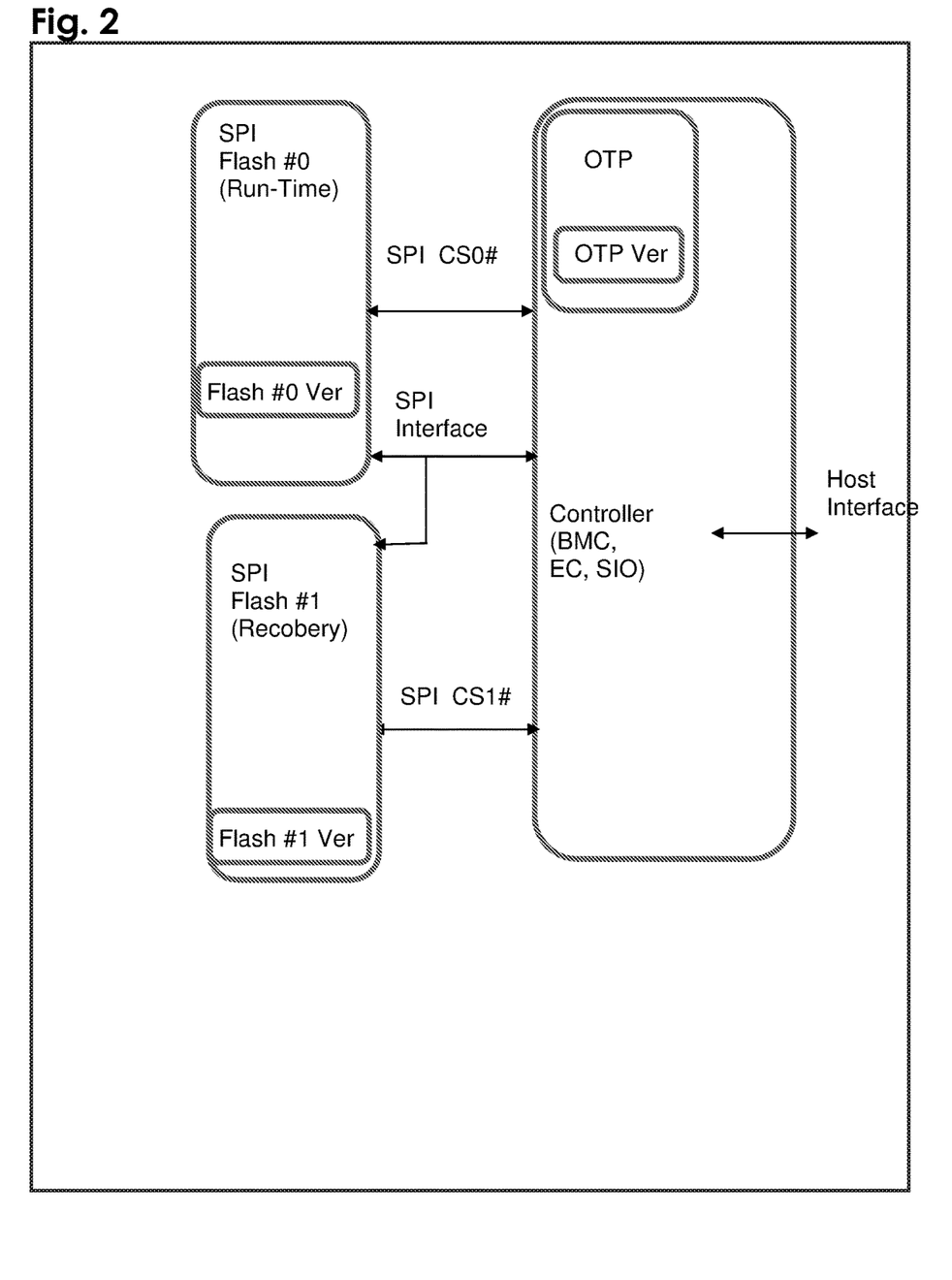
FIGS. 2 and 3 are simplified block diagram illustrations of systems constructed in accordance with embodiments of the invention; components of each of these embodiments may be combined with the other, if desired, or with any embodiment or method described or illustrated herein; all or any subset of the illustrated components may be provided.

As shown in FIG. 2, certain embodiments combine code version number fields stored in external memory with version data stored in an internal OTP space. The version fields may be stored in two copies, one (Flash #0 Ver) on external memory #0 and the other (Flash #1 Ver) on external memory #1.

The external memory may comprise SPI flash. Firmware update is performed on the runtime external memory (flash 0 in FIG. 2).

The version field may be implemented by two numbers or scalars both programmed in Flash: OTP version (OTP_VER) and Flash Version (FLASH_VER).

The OTP is expected to mirror the recovery/active flash major version; if not, it may be assumed that a rollback attack has been attempted.

It is appreciated that, typically, the two numbers are always the same, other than during update procedures, at which times the active and recovery/OTP version numbers are different.

The recovery flash is typically used to recover runtime (active) flash content in a case of rollback attack or unsuccessful update attempt.

The active (or run-time) flash, which is typically identical physically to the recovery flash, may be used for any of numerous purposes including e.g. storing the firmware or any desired data. The version number usually has a fixed place in the firmware image. The recovery flash may hold a backup of any content stored in the active flash at the time of the last update. If needed, the recovery flash can be configured in some form to hold other types of constant data; the flash is write protected.

On any firmware update, typically either the OTP version number or the Flash Version (FLASH_VER), is incremented. Any progressing version number can be used. An example update process is described herein.

In FIG. 2, OTP VER, the OTP version, typically comprises the highest bit programmed with the value of 1 in the OTP dedicated version field. In the flash, the code (firmware)+version number are typically signed together, e.g. so as to be inseparable.

The version field storing the code version number is typically authenticated e.g. with the firmware's public key. When incrementing either the OTP or FLASH version of the code version number, the new version of the firmware code is typically first updated in Flash #0.

Any suitable method may be employed to determine whether the version in flash #0 is running reliably. For example, during the update process, the new firmware may be loaded in the device and the device runs various tests (for example communication, display) to ensure that the device will be able to recover in case of any system failure.

Typically, once the version in flash #0 is running reliably, the firmware update continues e.g. as follows:
 If the version number as incremented was the OTP version (OTP_VER) the version in the OTP space is likewise incremented, and in addition the versions in Flash #1 are also updated accordingly.
 If the version number as incremented was the Flash version (FLASH_VER), only the FLASH_VER in Flash #1 is updated, whereas the OTP version is not updated. The logic that ensures this firmware update may be stored in any suitable location e.g. in the secure code (e.g. the ROM code) and along the whole boot hierarchy. Typically, the ROM code is on the highest security level and the reliability test is on the lowest level of security alongside the user processes.

When a new product version is released, e.g. for a standard OTP version implementation which does not employ the apparatus and methods described herein, the OTP firmware version field (e.g. OTP Ver in FIG. 2) may have already used a large number of bits in the OTP memory, thus limiting the number of additional OTP version updates to the number of remaining bits in OTP version memory. For example, if only three OTP bits remain, then only three updates are possible.

To bypass this issue in new products, the released (first) version number can be written into a different field in the otp (first_ver_num). The logic which ensures this number will be written into a "different" field may, for example, reside in the ROM code during the update process, or may be programmed externally in the flash device.

For example, an 8 bit field can represent any version number from 0-255. It is appreciated that instead of 8 bits in hexadecimal representation, any different method can be used in order to represent the current firmware version. For example, instead of a first version number, there may be an area in the OTP where each burnt bit represents a jump of 16 regular version numbers.

For example, in an older device, the OTP version memory may represent version 33 (in which case 33 version bits are already used in the OTP). However, in a new product the FIRST_VER_NUM field may be 33, while the OTP_VER field may have no bits used. On a firmware update the new and old products may both burn a bit in the OTP, as governed by LOGIC residing, say, in a ROM/secured code at boot time.

It is appreciated that, typically, an older device may have already used many OTP bits from older firmware versions. The newer device did not use these firmware versions, and therefore did not burn these OTP bits. By virtue of the fact that the OTP_VER field, provided in the new product, but not in the old product, has no bits used, the new product will be able to undergo more firmware releases than the old product can, which effectively extends the new product's lifetime, compared to the old product.

It is appreciated that for old devices, if all the version OTP bits are burnt, the flash can be used, instead, to represent the OTP version. This may compromise rollback attack prevention capability. There may be an extension to the version numbers of the OTP in the flash.

It is appreciated that any version update in flash #1 and OTP is carried out by a secured code, which may reside and run in a firmware layer 0 (the first layer after ROM code), or may run on a separate protected processor, or by any other secured hardware.

Figure 3:
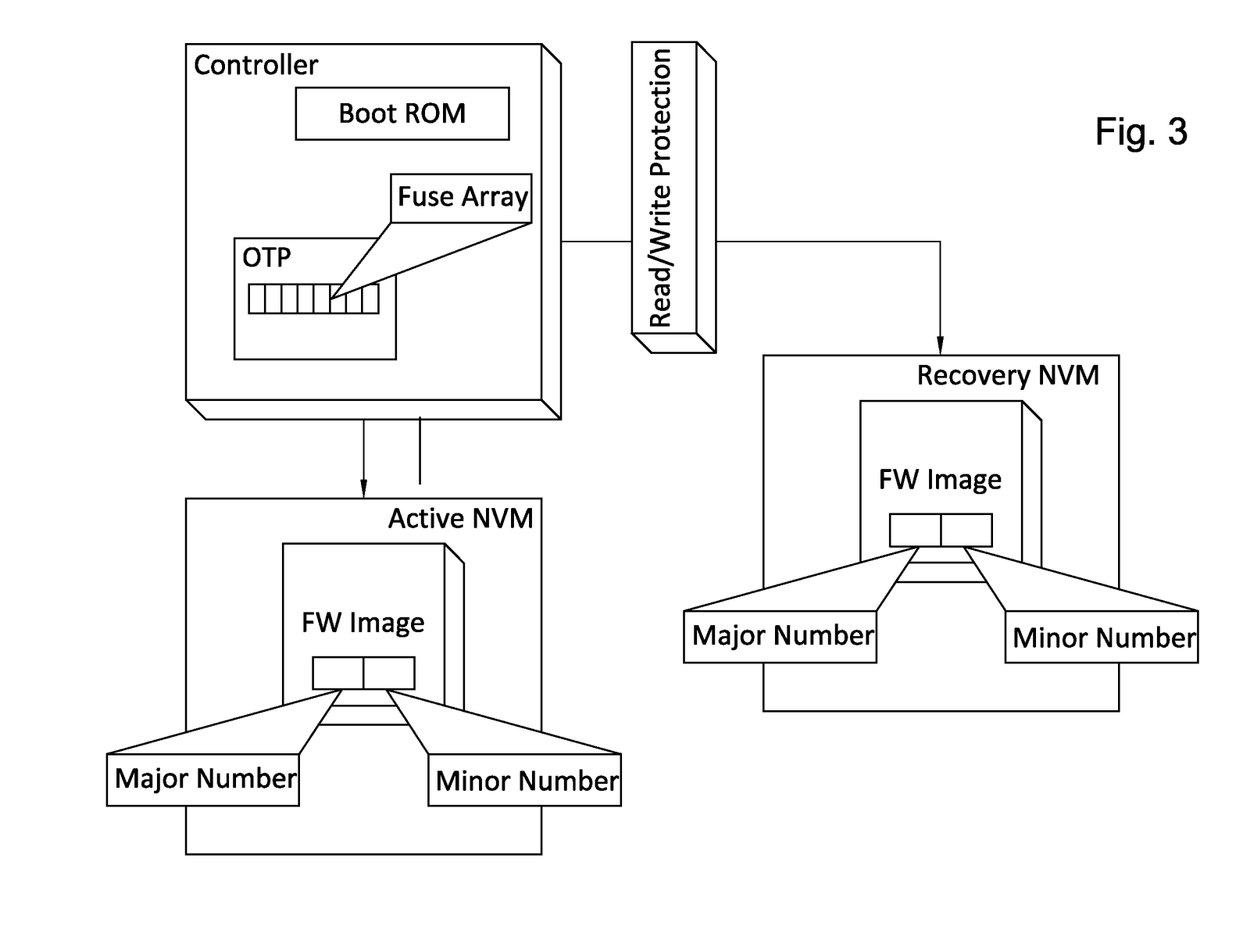

Certain embodiments seek to provide a secure version control system that prevents rollback attacks of embedded firmware (FW) stored in non-volatile (NV) storage devices (such as but not limited to disc, SPI flash device or any other NV memory). The system herein is operative to prevent rollback attacks by preventing the system from booting up an older version of the firmware once a newer firmware version has been updated and validated. This facilitates secure updates to firmware e.g. where vulnerabilities to the older firmware version were discovered. Typically, upon each boot flow, before activating the code in the device, secured code compares the OTP and flash version numbers for compliance. If the comparison results in non-compliance, the boot fails and halts. For example, FIG. 3 is a simplified block diagram illustration of a Rollback prevention system (RPS) including all or any subset of the following components:

a. An embedded chip with bootloader ROM code that runs whenever the chip is powered-on
b. Two non-volatile memory (NVM) devices to hold firmware to run on boot
c. One-Time-Programmable (OTP) or "fuse" memory integrated in the chip to store the version number fuses
d. A hardware (HW) device or method to disable reading and writing to one of the NVMs Embodiments include but are not limited to the following:

Embodiment 1: A computerized system protected from rollback attacks which might otherwise occur when the system's firmware is changed, thereby to define versions of the firmware, the system comprising all or any subset of:

i. a chip including
   a. ROM code including a bootloader (aka boot ROM code) integrated into the chip silicon, and wherein the boot ROM code runs whenever the chip is powered on; and
   b. programmable fuse array memory (e.g. One-Time-Programmable (OTP) memory) in which to store version identifiers (e.g. version numbers);
ii. First (aka active) and second (aka recovery) non-volatile memories (aka NVMs) in which first and second copies of a version of bootable firmware (aka firmware which is loaded on boot), are respectively stored;
   wherein a first identifier is stored in the active NVM, which, when stored, uniquely identifies the version, the first copy of which is stored in the active NVM, the first identifier including at least an active major number and an active minor number, both signed with a private key;
   wherein a second identifier is stored in the recovery NVM which, when stored, uniquely identifies the version, the second copy of which is stored in the recovery NVM, the second identifier including at least a recovery major number and a recovery minor number, both signed with the private key; and
iii. A hardware device which obeys a first command, provided by the boot ROM code after boot-up aka at bootloader completion, to lock (aka disable at least writing to aka provide write protection to), until next system reset, at least the recovery NVM (and optionally the OTP) including ensuring at least the recovery NVM (and optionally the OTP) is not writeable, aka not accessible, for writing, other than to the bootloader, and obeys a second command, provided by the boot ROM code upon the next system reset, to lift the write protection of at least the recovery NVM (and optionally the OTP), thereby to provide a system able to prevent an older version of the firmware from being booted up, once a newer version of the firmware has been validated.

wherein firmware images may be associated with both the versions, and
   wherein both the identifiers may be signed with the private key, and
   wherein the boot ROM code may be configured to authenticate at least one
   firmware image and/or to authenticate the first and/or second identifiers.

The boot ROM code may authenticate both the major and minor numbers e.g. in both the recovery NVM and the active NVM.

It is appreciated that the firmware code itself is typically only in the NVM before boot, whereas after boot the code is typically also stored in the device RAM.

According to certain embodiments, during the boot stage no external code is executable, and at the end of the boot stage, but before any external code is able to run, the write protect is back in place, thereby to effectively prevent rollback attacks.

The image of the firmware may be stored in the flash.

Each firmware version number is typically associated with, and signed together with, a specific firmware image.

Normally, the firmware images in both NVMs, are the same. However, during boot time, the ROM code may be configured to enable boot only if the minor version number in the active image is higher than, or equal to, the minor version number in the recovery image, and/or the ROM code may be configured to enable boot only if the major version number in the active image is higher than, or equal to, the version number in the OTP.

The term "reset" is used herein to include events after which, or as a result of which, the chip is powered on anew.

Typically, the private key holder is the system manufacturer, and the private key is secret in that only an entity authorized to sign a firmware image has access to this key (hence only that authorized entity is able to sign the firmware image using the key).

Typically, the public key is stored in a write protected memory (e.g. the above ROM code, or write protected OTP, or write protected embedded flash) inside the silicon device.

Typically, the public key must not be modifiable by an unauthorized code, to prevent any usage of a modified public/private key pair. The ROM code may verify a header which contains a second key that can be used to authenticate the firmware itself; this is valid since the second key is validated.

Embodiment 2. A method for protecting a system from rollback attacks which might otherwise occur when firmware in the system is changed, thereby to define versions, the method comprising:

i. providing a system including all or any subset of the elements of embodiment 1;
ii. storing copies of a first version of bootable firmware (aka first firmware image), in the active and recovery NVMs;
   storing first and second copies of at least a major number of the first version, in the first and second non-volatile memory devices respectively; and
   programming at least one bit in the OTP memory to equal aka match the major number;

iii. at least once performing a minor update of the firmware, including replacing the version of bootable firmware stored in the active NVM with a new "minor" version of the bootable firmware, and replacing the identifier stored in the active NVM with a new identifier including a higher minor number; and iv. after at least one reset which necessitates a boot,
   a. commanding the boot loader:
      to determine, at least if the active NVM's content is valid, whether or not the identifier in the active NVM is greater than the OTP number; and
      to halt if the major number in the active NVM is lower than the OTP number, and
   b. only if the identifier in the active NVM (aka active minor) is greater than the identifier in the identifier in the recovery NVM (aka recovery minor), performing operations b1, b2, respectively including:
      operation b1. the new version of the bootable firmware is written over the version of the bootable firmware currently stored in the recovery NVM; and
      operation b2. the identifier in the recovery NVM is updated to equal the value of the identifier in the active NVM.

Typically, firmware and version numbers must be signed together so that the version number and the actual bootable firmware are interlinked. If an attacker attempts to replace the firmware content while leaving the version number, or vice versa, signature authentication will fail. Thus the signature renders the version number meaningful for security.

In the recovery NVM the signature is used so as to be an identical copy to the active NVM in the event of an auto recovery e.g. as described herein.

Typically the OTP bits are programmed to match the major number of the version also stored in both of the NVMs.

It is appreciated that the recovery NVM is not accessible (locked for writing) to the user post boot. Only the bootloader can write to the recovery NVM.

It is appreciated that each bit in OTP is programmed to binary 1, otherwise it is binary 0. In the fuse array stored in OTP, the index of a bit in an array (e.g. including bits 0-64) corresponds to an OTP number. Example: If program bit 17 of the array (say) is the highest bit programmed to 1, this is interpreted as OTP number 17. If the bit at index 19 would then be programmed to 1, that would change the OTP number to 19. This is doable as long as the ascending OTP indices are not depleted, thus if the array is, say, 64 bits, then the highest OTP number storable is 64.

Embodiment 3. The system according to embodiment 1 or according to any of the preceding embodiments wherein the OTP memory includes plural fuses whose states represent version numbers.

Embodiment 4. The system according to embodiment 1 or according to any of the preceding embodiments wherein plural bits in the OTP (aka OTP bits) are used to represent a number, $$OTP\text{-}Number = Starting\text{-}Number + Counter,$$

the plural bits including an array of n bits, thereby to define n bit indices associated respectively with the n bits, the n bits including a ("first") subset of bits having a value of "0" and a ("second") subset of bits which have been fused to 1, and wherein the counter is determined as a highest index from among the bit indices associated with the ("second") subset of the n bits which have been fused to one.

The encoded starting number typically resides in a non-volatile internal protected memory e.g. in the (or another) OTP, in an embedded flash, or in ROM code.

The above feature is also termed herein an "offset feature and the starting number is also termed herein the "offset".

The starting-number aka offset may be encoded e.g. as an ordinary binary number. Or, instead of storing a simple number (e.g. 1, 45 or 100), alternative methods may be used to store the starting number while using fewer OTP fuses, thereby conserving OTP fuses while still lengthening the lifetime of the product. For example, in a field of 5 fuses, each programmed fuse corresponds to an starting number increment of 50, meaning a starting number of 150:

| X | X | X |   |   |
|---|---|---|---|---| which would mean a max starting number of 250:

| X | X | X | X | X |
|---|---|---|---|---| whereas, in comparison, writing the number 250 in binary format would have required 8 fuses:

| X | X | X | X |   | X |   | X |
|---|---|---|---|---|---|---|---|

For example, here is an array where only the $3^{rd}$ bit is fused (which is possible, although most commonly, bits 1 to 3 will all be fused. Hence the latest valid major number is 3.

|   |   | X |   |   |   |   |   |   |
|---|---|---|---|---|---|---|---|---|

In this array $7^{th}$ bit is also fused (although more commonly, all of bits 1 to 7, or at least bits 3 to 7, will be fused). Hence the latest valid major number is 7.

|   |   | X |   |   |   | X |   |   |
|---|---|---|---|---|---|---|---|---|

In contrast, if another area (e.g. byte) stores an encoded number aka starting number) in the OTP, the interpretation will be offset e.g. as per the following example:

If the value "75", for example, is stored (as a binary or decimal number, or using any other efficient method) in the starting number field in the OTP:

| 75 |
|----|

Then, given an array where only the $3^{rd}$ bit is fused, the latest valid major number is 3+75=78, not 3.

|   |   | X |   |   |   |   |   |   |
|---|---|---|---|---|---|---|---|---|

Similarly, given an array in which the 7$^{th}$ bit is also fused, the latest valid major number is 7+75=82, not 7.

| | | X | | | | X | | | |
|---|---|---|---|---|---|---|---|---|---|

It is appreciated that this embodiment extends the product lifetime, relative to a system in which no starting number is provided.

Embodiment 5. The system according to embodiment 1 or according to any of the preceding embodiments wherein the hardware device is not operative to disable reading from and/or writing to the active NVM such that the active NVM is readable and writeable, after boot-up.

Embodiment 6. The system according to embodiment 4 or according to any of the preceding embodiments wherein, when the first firmware image is stored in the active and recovery NVMs, the OTP number equals the major number stored in both NVMs.

Embodiment 7. The method according to embodiment 2 or according to any of the preceding embodiments wherein locking of the recovery NVM by the hardware device also includes disabling reading from the recovery NVM, including ensuring the recovery NVM is not readable.

Embodiment 8. The method according to embodiment 2 or according to any of the preceding embodiments wherein locking the recovery NVM includes disconnecting the recovery NVM.

Embodiment 9. The method according to embodiment 2 or according to any of the preceding embodiments wherein locking of the OTP by the hardware device also includes disabling reading from the recovery NVM, including ensuring the OTP is not readable.

Embodiment 10. The method according to embodiment 2 or according to any of the preceding embodiments wherein the first version of bootable firmware stored in each of the active and recovery NVMs and at least the major number are signed, together, with a public key, thereby to generate a signature.

It is appreciated that this embodiment is useful for signed code, since for unsigned code, the same version may be associated with any code.

Typically, the public key is associated with a private key, which is held (only) by an authorized firmware publisher.

The (public) key held with the firmware may be used to authenticate a higher level firmware.

Embodiment 11. The method according to embodiment 10 or according to any of the preceding embodiments wherein the boot loader's test of the active NVM's content for validity includes cryptographic authentication of the active NVM's content with the signature.

Embodiment 12. The method according to embodiment 11 or according to any of the preceding embodiments wherein the authentication uses a public key, paired with the private key and wherein the public key, but not the private key, is stored in the OTP.

The private key is typically stored (only) by an authorized signer.

Embodiment 13. The method according to embodiment 2 or according to any of the preceding embodiments and wherein the boot loader's test of the active NVM's content for validity includes ensuring that the major number in the active NVM is higher than or equal to the major number in the recovery NVM.

Embodiment 14. The method according to embodiment 2 or according to any of the preceding embodiments and wherein the boot loader's test of the active NVM's content for validity includes providing an indication from at least one system level test to ensure at least one predetermined criterion.

Embodiment 15. The method according to embodiment 14 or according to any of the preceding embodiments and wherein the criterion comprises a determination that the new version of the bootable firmware is stable for booting from.

A previous successful boot is an example of a criterion for the determination that the new version of the bootable firmware is stable for booting from.

Embodiment 16. The method according to embodiment 2 or according to any of the preceding embodiments and wherein the bootloader completes the boot successfully, if and only if the major number in the active NVM is equal to the OTP number; and a test e.g. by bootloader ascertains valid content in the active NVM.

Embodiment 17. The method according to embodiment 2 or according to any of the preceding embodiments wherein a chain of trust is implemented by at least once, iteratively, using authenticated code to authenticate an additional code level which includes additional major and/or minor version numbers, which can authenticate yet another code level.

The authenticated code may, after authentication, be loaded from the NVM to RAM.

Embodiment 18. A system according to embodiment 1 or according to any of the preceding embodiments wherein the active and recovery NVMs comprise two separate memory devices.

Embodiment 19. A system according to embodiment 1 or according to any of the preceding embodiments wherein the active and recovery NVMs comprise two memory ranges on a single flash device.

Embodiment 20. The system according to embodiment 4 or according to any of the preceding embodiments wherein the starting number is write-protected.

Embodiment 21. The method according to embodiment 2 or according to any of the preceding embodiments and also comprising commanding the boot loader to test the active NVMs content for validity, and to halt, thereby to cause failure of the boot, if the active NVM's content is not valid.

Embodiment 22. The method according to embodiment 21 or according to any of the preceding embodiments and wherein the bootloader tests the active NVM's content for validity before the bootloader determines whether or not the identifier in the active NVM is greater than the OTP number, or the NVM or active NVM content is valid.

Embodiment 23. The method according to embodiment 2 or according to any of the preceding embodiments wherein the operations b1, b2 are performed by authenticated code.

Typically, the authenticated code resides in the NVM, or in the ROM code boot block in ROM, or in a/the OTP, or in protected embedded flash, or in authenticated code in RAM.

Embodiment 24. The method according to embodiment 2 or according to any of the preceding embodiments wherein the operations b1, b2 are performed by the bootloader.

Embodiment 25. The method according to embodiment 2 or according to any of the preceding embodiments, the method also comprising performing, at least once, a major update of the firmware, including replacing the version of bootable firmware stored in the active NVM with a new "major" version of the bootable firmware and replacing the identifier stored in the active NVM with a new identifier including a higher major number; and vi. after at least one reset which necessitates a boot,
    a. commanding the boot loader:
        to test the active NVM's content for validity,
        to halt, thereby to cause failure of the boot, if the active NVM's content is not valid,
        to determine, at least if the active NVM's content is valid, whether or not the identifier in the active NVM is greater than the OTP number; and
        to halt if the major number in the active NVM is lower than the OTP number, and
    b. Only if the identifier in the active NVM is greater than the OTP number, performing operations b4, b5, b6, respectively including:
        operation b4. the new version of the bootable firmware is written over the version of the bootable firmware currently stored in the recovery NVM;
        operation b5. the identifier in the recovery NVM is updated to equal the value of the identifier in the active NVM; and
        operation b6. a free bit in the Fuse Array is programmed to the value of the identifier in the active NVM, to ensure that the OTP number equals the identifier in the active NVM and also equals the identifier in the recovery NVM.

It is appreciated that the order of operations described herein is not intended to be limiting. For example, it is not necessarily the case that operation b4 is performed first, followed by operation b5 which is followed by operation b6. Any other order may be used.

Embodiment 26. The method according to embodiment 25 or according to any of the preceding embodiments wherein the operations b4, b5, b6 are performed by authenticated code.

Typically, the authenticated code resides in the NVM.

Embodiment 27. The method according to embodiment 25 or according to any of the preceding embodiments wherein the operations b4, b5, b6 are performed by the bootloader.

Embodiment 28. The system of embodiment 4 or according to any of the preceding embodiments and wherein the OTP number is used as a comparing reference to each of the active major and the recovery major numbers.

Embodiment 29. The method according to embodiment 11 or according to any of the preceding embodiments wherein the authentication uses a public key, paired with the private key and wherein the public key, but not the private key, is stored in the ROM.

Figure 4:
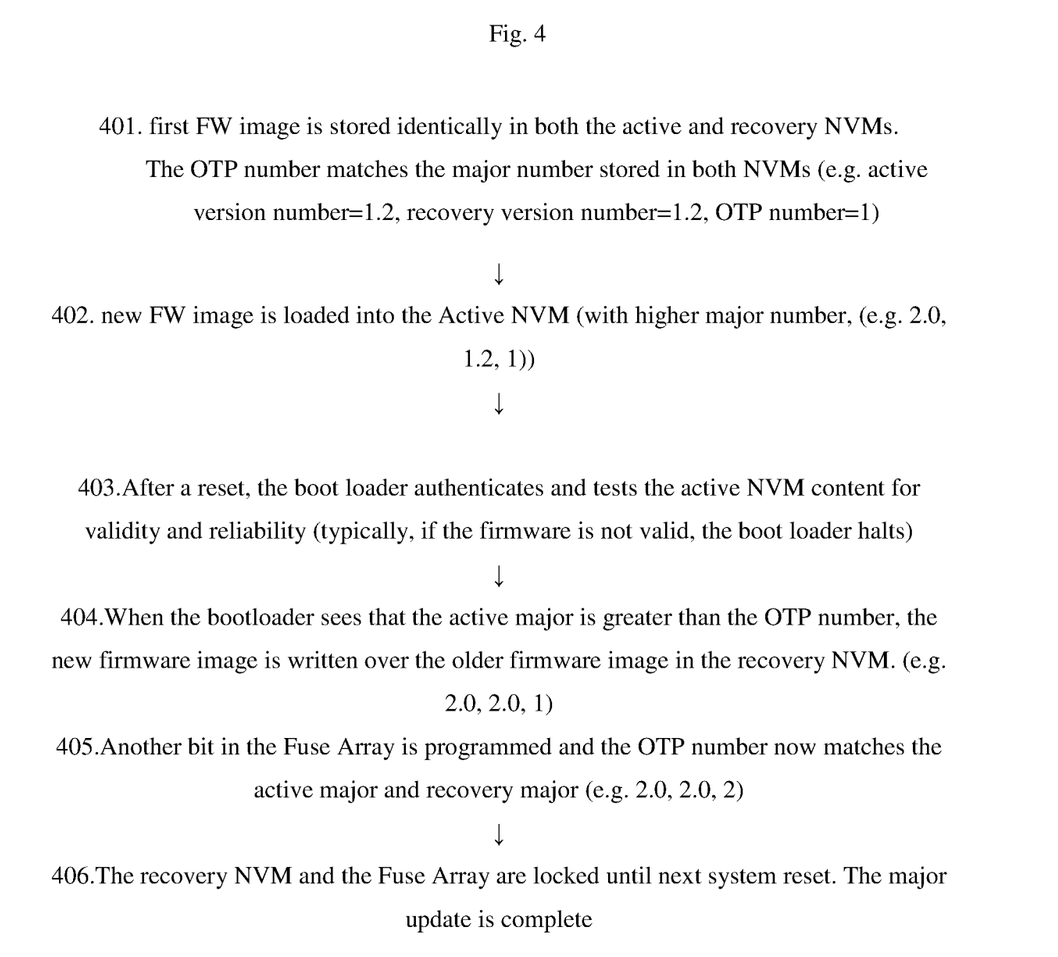
FIGS. 4-5 describe initial setup and update processes according to certain embodiments.

Initial Setup and Update Stages may be provided as described below in FIGS. 4 and 5 respectively, either standalone or separately, or in combination, in conjunction with any of the embodiments described or illustrated herein. Specifically:

FIG. 4 is a simplified flowchart illustration of a method for loading a new firmware image with higher Major Number ("Major Update") according to certain embodiments. The method of FIG. 4 typically includes all or any subset of the following operations, suitably ordered e.g. as follows:

1. The first firmware image is stored identically in both the active and recovery NVMs.
    The OTP number matches the major number stored in both NVMs (active version number=1.2, recovery version number=1.2, OTP number=1).
2. The new firmware image is loaded into the active NVM (with higher major number, (2.0, 1.2, 1)).
3. After a reset, the bootloader authenticates and tests the active NVM content for validity and reliability (if the firmware is not valid, the bootloader halts).
4. When the bootloader sees that the active major is greater than the OTP number, the new firmware image is written over the older firmware image in the recovery NVM. (2.0, 2.0, 1).
5. Another bit in the Fuse Array is programmed and the OTP number now matches the active major and recovery major (2.0, 2.0, 2).
6. The recovery NVM and the Fuse Array are locked until next system reset. The major update is complete.

Figure 5:
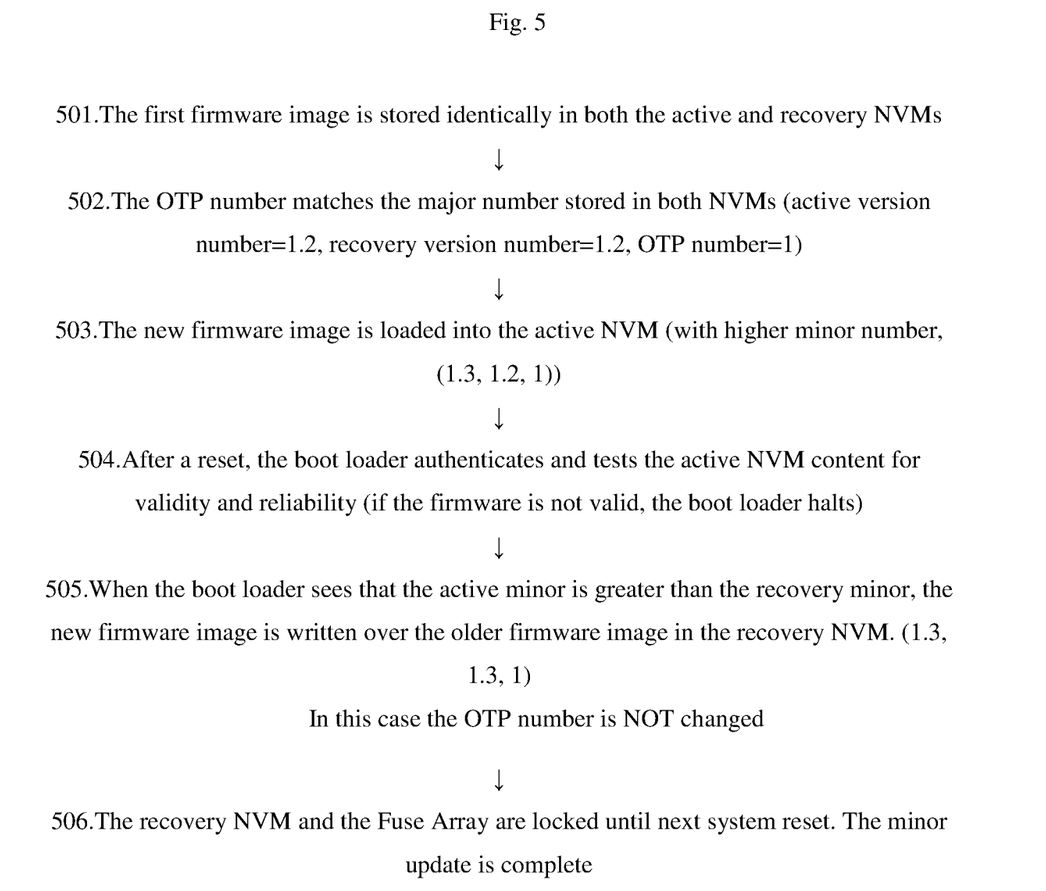

FIG. 5 is a simplified flowchart illustration of a method for loading a new firmware image with higher Minor Number ("Minor Update") according to certain embodiments.

The method of FIG. 5 typically includes all or any subset of the following operations, suitably ordered e.g. as follows:

1. The first firmware image is stored identically in both the active and recovery NVMs.
2. The OTP number matches the major number stored in both NVMs (active version number=1.2, recovery version number=1.2, OTP number=1).
3. The new firmware image is loaded into the active NVM (with higher minor number, (1.3, 1.2, 1)).
4. After a reset, the bootloader authenticates and tests the active NVM content for validity and reliability (if the firmware is not valid, the bootloader halts).
5. When the bootloader sees that the active minor is greater than the recovery minor, the new firmware image is written over the older firmware image in the recovery NVM. (1.3, 1.3, 1). In this case the OTP number is NOT changed.
6. The recovery NVM and the Fuse Array are locked until next system reset. The minor update is complete.

The Lifetime Extension Feature, which employs an OTP number offset field e.g. as described herein, may be provided in conjunction with any embodiment described or illustrated herein. The OTP space is limited. The irreversible or destructive nature of OTP memory means that a new silicon device can be loaded with an advanced firmware version (many fuse array bits will be "burnt"). This will result further in a limited lifetime for OTP version updates. To cope with this, another ("OTP Number Offset") field, apart from the fuse array, may be implemented in the OTP. This allows the OTP number to begin from an advanced number, lengthening the newer device's lifetime.

Advantages of certain embodiments include:

Provision of two version fields in the external memory devices protect against rollback attacks of older firmware. The anti-rollback solution described herein is advantageous inter alia because an attacker cannot tamper with the firmware image e.g. because any change to the firmware image would break the RSA signature validity. The protection (e.g. of the firmware) on the recovery NVM protects against any non-physical attack on the active NVM firmware mage. Even if the attacker wished to completely overwrite the firmware image with an older signed one, the recovery NVM firmware image with its greater version number would convey to the bootloader that this is indeed a rollback attack. In the event of an attacker that were to physically replace both NVMs (active and recovery) with an older firmware image (containing a lower version number than the original), the OTP number would convey to the bootloader that this is indeed a rollback attack. If the only a minor update was performed, a physical replacement of both NVMs, as above, would not be immune e.g. to threats. Thus provision of the OTP field protects against (at least) another threat, e.g.

double rollback attack by replacement of both external memories with older version firmware in both of the new devices.

Another advantage is that the version data is not encrypted, thus the version, which is typically stored as non-encrypted, is updatable.

Certain embodiments provide secure version control, despite limited OTP space, which, in state of the art systems, has limited the amount or number of code updates a given system can receive.

The Lifetime Extension Feature described herein is advantageous as illustrated by the following example. Consider a product which lasts for 15 years given around 4 major updates per year, assuming 64 fuse array bits. If a new batch is manufactured 10 years down the line, the method described herein, including the Lifetime Extension Feature, can extend the lifetime of the new batch by 10 years. Absent the Lifetime Extension Feature, the new batch would only last for 5 years because ⅔ of the bits will be immediately "wasted" upon initial firmware image setup. The "older" devices may need to be retired after their 15 years (or maximum major updates) is up.

Many variations are possible. For example, it is appreciated that the illustrated embodiments happen to use version numbers, not names, which happen to include major and minor components, each of which happen to be assigned in increasing order, however, none of these attributes of the illustrated embodiments are intended to be limiting. Also, according to certain embodiments, two-tier protection is provided herein, in which major firmware versions get stronger anti-rollback protection, whereas minor firmware versions get weaker protection against rollback attacks. The lifetime extension feature described herein, which employs an OTP number offset field e.g. as described herein, may or may not be provided. According to other embodiments, one-tier protection is provided herein, with rollback protection only for major firmware versions, combined with a lifetime extension feature which employs an OTP number offset field e.g. as described herein. It is appreciated that applicability of embodiments herein extends to any system containing an OTP, and two devices, at least one of which is write protected, and holds the device firmware code.

Any one-tier embodiment prevents all non-physical rollback attacks which involve overwriting the active NVM, but will not protect against a physical rollback attack of simultaneously switching out both NVMs with older firmware in both. This protection is possible in two-tier embodiments which provide physical presence, since the recovery NVM is otherwise locked for writing.

It is appreciated that the write protected NVM may store an entire extra copy of the newest version, or may store just the version number.

Firmware, if used to implement certain embodiments herein, may be held in non-volatile memory, e.g. Flash or ROM.

Alternatively, certain embodiments described herein may be implemented partly or exclusively (i.e. without firmware) in hardware, in which case some or all of the variables, parameters, sequential operations and computations described herein may be in hardware.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Features of the present invention, including operations, which are described in the context of separate embodiments, may also be provided in combination in a single embodiment. For example, a system embodiment is intended to include a corresponding process embodiment and vice versa. Features may also be combined with features known in the art and particularly, although not limited to those described in the Background section or in publications mentioned therein. Conversely, features of the invention, including operations, described for brevity in the context of a single embodiment or in a certain order, may be provided separately or in any suitable sub-combination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

Each element e.g. operation described herein may have all characteristics described or illustrated herein or according to other embodiments, may have any subset of the characteristics described herein.

It is appreciated that elements illustrated in more than one drawings, and/or elements in the written description may still be combined into a single embodiment, except if otherwise specifically clarified herewithin. It is appreciated that any features, properties, logic, modules, blocks, operations or functionalities described herein which are, for clarity, described in the context of separate embodiments, may also be provided in combination in a single embodiment except where the specification or general knowledge specifically indicates that certain teachings are mutually contradictory and cannot be combined. Any of the systems shown and described herein may be used to implement or may be combined with, any of the operations or methods shown and described herein.

The invention claimed is:

1. A computerized system protected from rollback attacks which might otherwise occur when the system's firmware is changed, thereby to define versions of the firmware, the system comprising:
   i. a chip including
      a. ROM code including a bootloader (also known as boot ROM code) integrated into the chip silicon, and wherein said boot ROM code runs whenever the chip is powered on; and
      b. programmable fuse array memory comprising a one-Time-Programmable (OTP) memory in which to store version identifiers comprising a version numbers;
   ii. first (also known as active) and second (also known as recovery) non-volatile memories (also known as NVMs) in which first and second copies of a version of bootable firmware (also known as firmware which is loaded on boot), are respectively stored;
      wherein a first identifier is stored in the active NVM which, when stored, uniquely identifies said version, the first copy of which is stored in the active NVM, the first identifier including at least an active major number and an active minor number, both signed with a private key; wherein a second identifier is stored in the recovery NVM, which, when stored, uniquely identifies said version, the second copy of which is stored in the recovery NVM, the second identifier including at least a recovery major number and a recovery minor number, both signed with said private key; and iii. a hardware device which obeys a first command, provided by the boot ROM code after boot-up also known as at bootloader completion, to lock (also known as disable, at least writing to also known as provide write protection to), until next system reset, at least the recovery NVM including ensuring at least the recovery NVM is not writeable also known as not accessible for writing, other than to the bootloader, and obeys a second command, provided by the boot ROM code upon said next system reset, to lift the write protection of at least the recovery NVM, thereby to provide the system with an ability to prevent an older version of the firmware from being booted up, once a newer version of the firmware has been validated, wherein firmware images associated with both said versions, and both said identifiers, are signed with said private key, and wherein the boot ROM code is configured to authenticate at least one firmware image and to authenticate said first and second identifiers;

the system implemented by at least one processor being configured for:

storing copies of a first version of bootable firmware (also know as first firmware image), in said active and recovery NVMs;

storing first and second copies of at least a major number of the first version, in said first and second non-volatile memory devices respectively; and programming at least one bit in the OTP memory to equal also known as match said major number; and at least once performing a minor update of the firmware, including replacing the version of bootable firmware stored in the active NVM with a new "minor" version of the bootable firmware and replacing the identifier stored in the active NVM with a new identifier including a higher minor number; and after at least one reset which necessitates a boot, a. commanding the boot loader: to determine, at least if the active NVM's content is valid, whether or not the identifier in the active NVM is greater than said OTP number; and to halt if the major number in the active NVM is lower than said OTP number, and b. only if the identifier in the active NVM (also known as active minor) is greater than the identifier in the identifier in the recovery NVM (also known as recovery minor), performing operations bi, b2, respectively including:

operation b1. the new version of the bootable firmware is written over the version of the bootable firmware currently stored in the recovery NVM; and operation b2. the identifier in the recovery NVM is updated to equal the value of the identifier in the active NVM.

2. The system according to claim 1 wherein said OTP memory includes plural fuses whose states represent version numbers.

3. The system according to claim 1 wherein plural bits in said OTP (also known as OTP bits) are used to represent a number, OTP-Number=Starting-Number+Counter, the plural bits including an array of n bits, thereby to define n bit indices associated respectively with said n bits, said n bits including a ("first") subset of bits having a value of "0" and a ("second") subset of bits which have been fused to 1, and wherein said counter is determined as a highest index from among the bit indices associated with said ("second") subset of said n bits which have been fused to one.

4. The system according to claim 1 wherein the hardware device is not operative to disable reading from and/or writing to the active NVM such that the active NVM is readable and writeable, after boot-up.

5. The system according to claim 3 wherein, when the first firmware image is stored in the active and recovery NVMs, said OT number equals the major number stored in both NVMs.

6. A system according to claim 1 wherein said active and recovery NVMs comprise two separate memory devices.

7. A system according to claim 1 wherein said active and recovery NVMs comprise two memory ranges on a single flash device.

8. The system according to claim 3 wherein the starting number is write-protected.

9. The system of claim 3 and wherein said OTP number is used to as a comparing reference to each of said active major and said recovery major numbers.

10. A method for protecting a system from rollback attacks which might otherwise occur when firmware in the system is changed, thereby to define versions, the method comprising:

I. providing a system including i. a chip including a. ROM code including a bootloader (also known as boot ROM code) integrated into the chip silicon, and wherein said boot ROM code runs whenever the chip is powered on; and b. programmable fuse array memory comprising a One-Time-Programmable (OTP) memory in which to store version identifiers comprising a version numbers;

ii. first (also known as active) and second (also known as recovery) non-volatile memories (also known as NVMs) in which first and second copies of a version of bootable firmware (also known as firmware which is loaded on boot), are respectively stored;

wherein a first identifier is stored in the active NVM which, when stored, uniquely identifies said version, the first copy of which is stored in the active NVM, the first identifier including at least an active major number and an active minor number, both signed with a private key;

wherein a second identifier is stored in the recovery NVM which, when stored, uniquely identifies said version, the second copy of which is stored in the recovery NVM, the second identifier including at least a recovery major number and a recovery minor number, both signed with said private key; and iii. a hardware device which obeys a first command, provided by the boot ROM code after boot-up also known as at bootloader completion, to lock (also known as disable, at least writing to aka provide write protection to), until next system reset, at least the recovery NVM including ensuring at least the recovery NVM is not writeable also known as not accessible for writing, other than to the bootloader, and obeys a second command, provided by the boot ROM code upon said next system reset, to lift the write protection of at least the recovery NVM, thereby to render the system able to prevent an older version of the firmware from being booted up, once a newer version of the firmware has been validated, II. storing copies of a first version of bootable firmware (also known as first firmware image), in said active and recovery NVMs;

storing first and second copies of at least a major number of the first version, in said first and second non-volatile memory devices respectively; and programming at least one bit in the OTP memory to equal also known as match said major number;

III. at least once performing a minor update of the firmware, including replacing the version of bootable firmware stored in the active NVM with a new "minor" version of the bootable firmware and replacing the identifier stored in the active NVM with a new identifier including a higher minor number; and IV. after at least one reset which necessitates a boot,
  a. commanding the boot loader: to determine, at least if the active NVM's content is valid, whether or not the identifier in the active NVM is greater than said OTP number; and to halt if the major number in the active NVM is lower than said OTP number, and
  b. only if the identifier in the active NVM (also known as active minor) is greater than the identifier in the identifier in the recovery NVM (also known as recovery minor), performing operations bi, b2, respectively including: operation
    b1. the new version of the bootable firmware is written over the version of the bootable firmware currently stored in the recovery NVM; and operation
    b2. the identifier in the recovery NVM is updated to equal the value of the identifier in the active NVM; wherein firmware images associated with both said versions, and both said identifiers, are signed with said private key, and wherein the boot ROM code is configured to authenticate at least one firmware image and to authenticate said first and second identifiers.

11. The method according to claim 10 wherein locking of the recovery NVM by the hardware device also includes disabling reading from the recovery NVM, including ensuring the recovery NVM is not readable.

12. The method according to claim 10 wherein locking the recovery NVM includes disconnecting the recovery NVM.

13. The method according to claim 10 wherein locking of the OTP by the hardware device also includes disabling reading from the recovery NVM, including ensuring the OTP is not readable.

14. The method according to claim 10 wherein the first version of bootable firmware stored in each of said active and recovery NVMs and at least said major number are signed, together, with a public key, thereby to generate a signature.

15. The method according to claim 14 wherein the bootloader's test of the active NVM's content for validity includes cryptographic authentication of the active NVM's content with the signature.

16. The method according to claim 15 wherein said authentication uses a public key, paired with said private key and wherein the public key, but not the private key, is stored in the OTP.

17. The method according to claim 15 wherein said authentication uses a public key, paired with said private key and wherein the public key, but not the private key, is stored in the ROM.

18. The method according to claim 10 and wherein the bootloader's test of the active NVM's content for validity includes ensuring that the major number in the active NVM is higher than or equal to the major number in the recovery NVM.

19. The method according to claim 10 and wherein the bootloader's test of the active NVM's content for validity includes providing an indication from at least one system level test to ensure at least one predetermined criterion.

20. The method according to claim 19 and wherein said criterion comprises a determination that the new version of the bootable firmware is stable for booting from.

21. The method according to claim 10 and wherein the bootloader completes the boot successfully if, and only if: the major number in the active NVM is equal to said OTP number; and a test ascertains valid content in the active NVM.

22. The method according to claim 10 wherein a chain of trust is implemented by at least once, iteratively, using authenticated code to authenticate an additional code level which includes additional major and/or minor version numbers, which can authenticate yet another code level.

23. The method according to claim 10 and also comprising commanding the boot loader to test the active NVM's content for validity, and to halt, thereby to cause failure of the boot, if the active NVM's content is not valid.

24. The method according to claim 23 and wherein the bootloader tests the active NVM's content for validity before the bootloader determines whether or not the identifier in the active NVM is greater than said OTP number, or the NVM or active NVM content is valid.

25. The method according to claim 10 wherein said operations b1, b2 are performed by authenticated code.

26. The method according to claim 10 wherein said operations b1, b2 are performed by the bootloader.

27. The method according to claim 10, the method also comprising performing, at least once, a major update of the firmware, including replacing the version of bootable firmware stored in the active NVM with a new "major" version of the bootable firmware and replacing the identifier stored in the active NVM with a new identifier including a higher major number; and vi. after at least one reset which necessitates a boot,
  a. commanding the boot loader:
    to test the active NVM's content for validity,
    to halt, thereby to cause failure of the boot, if the active NVM's content is not valid,
    to determine, at least if the active NVM's content is valid, whether or not the identifier in the active NVM is greater than said OTP number; and
    to halt if the major number in the active NVM is lower than said OTP number, and
  b. only if the identifier in the active NVM is greater than said OTP number, performing operations b4, b5, b6, respectively including:
    operation b4. the new version of the bootable firmware is written over the version of the bootable firmware currently stored in the recovery NVM;
    operation b5. the identifier in the recovery NVM is updated to equal the value of the identifier in the active NVM; and operation b6. a free bit in the Fuse Array is programmed to the value of the identifier in the active NVM, to ensure that said OTP number equals the identifier in the active NVM and also equals the identifier in the recovery NVM.

28. The method according to claim 27 wherein said operations b4, b5, b6 are performed by authenticated code.

29. The method according to claim 27 wherein said operations b4, b5, b6 are performed by the bootloader.

* * * * *